(12) United States Patent
Kemppainen et al.

(10) Patent No.: US 11,773,583 B1
(45) Date of Patent: Oct. 3, 2023

(54) BUILDING UNIT, METHOD FOR MANUFACTURING BUILDING UNIT AND BUILDING

(71) Applicant: Admares Group Oy, Turku (FI)

(72) Inventors: Riku Kemppainen, Turku (FI); Kauri Vartia, Alastaro (FI)

(73) Assignee: Admares Group Oy, Turku (FI)

( * ) Notice: Subject to any disclaimer, the term of this patent is extended or adjusted under 35 U.S.C. 154(b) by 0 days.

(21) Appl. No.: 18/063,962

(22) Filed: Dec. 9, 2022

(51) Int. Cl.
*E04B 1/348* (2006.01)
*F16B 47/00* (2006.01)

(52) U.S. Cl.
CPC ........ *E04B 1/34861* (2013.01); *F16B 47/003* (2013.01)

(58) Field of Classification Search
CPC .. E04B 1/34807; E04B 1/34861; E04H 1/005
See application file for complete search history.

(56) References Cited

U.S. PATENT DOCUMENTS

| | | | | |
|---|---|---|---|---|
| 2,499,498 | A * | 3/1950 | Hammond, Jr. ........ | E04H 1/005 |
| | | | | 414/277 |
| 4,067,159 | A * | 1/1978 | Juriss .................. | E04B 1/34861 |
| | | | | 52/285.3 |
| 9,663,937 | B2 * | 5/2017 | Goldman .............. | E04B 1/3483 |
| 2005/0210798 | A1 * | 9/2005 | Burg ..................... | E04B 2/7457 |
| | | | | 52/481.1 |
| 2007/0144079 | A1 * | 6/2007 | Hourihan ............ | E04B 1/34807 |
| | | | | 52/79.1 |
| 2016/0145853 | A1 * | 5/2016 | Timur .................... | G06F 30/13 |
| | | | | 52/27 |
| 2016/0312485 | A1 * | 10/2016 | Wilson ..................... | E04B 5/48 |
| 2017/0167128 | A1 * | 6/2017 | Bouveng ................. | E04B 1/20 |
| 2022/0213678 | A1 * | 7/2022 | Mallinowski ............ | E04B 1/20 |

FOREIGN PATENT DOCUMENTS

FR 2030466 A5 * 1/1969

* cited by examiner

*Primary Examiner* — Christine T Cajilig
(74) *Attorney, Agent, or Firm* — ZIEGLER IP LAW GROUP LLC (57) ABSTRACT

A volumetric, building unit including a support frame having a plurality of support frame members, a plurality of modular interior wall units, a plurality of modular interior ceiling units and a plurality of modular floor units and wherein the spaced apart coupling between the support frame and the interior walls and interior ceiling provides flexibility between the support frame and the interior wall and interior ceiling, so that the deformation of the support frame within a predetermined range is not transmitted to the interior wall and/or interior ceiling. Disclosed also a method for manufacturing a building unit and a modular building.

15 Claims, 8 Drawing Sheets

BUILDING UNIT, METHOD FOR MANUFACTURING BUILDING UNIT AND BUILDING

TECHNICAL FIELD

The present disclosure relates to volumetric building units. The present disclosure also relates to methods for manufacturing building units. The present disclosure also relates to modular buildings and buildings assembled of prefabricated building units.

BACKGROUND

Due to the rapid rise in population, providing enough infrastructure amenities is described as a significant challenge across the world. The difficulty is exacerbated by the rapid migration of people from rural to urban areas and the scarcity of land in metropolitan areas. A significant increase in the demand-supply imbalance for infrastructural amenities including residential structures, commercial buildings, educational buildings, industrial buildings, storage buildings, and so on has also resulted from the population growth and migration of people into metropolitan areas. Additionally, multi-story structures are being built on a large scale more frequently to accommodate the growing demand for such infrastructure services and due to the limited amount of available land area.

The multi-story structures are typically integrated constructions built on-site. But over the past few years, the method for building multi-story structures has changed (and also there are now other methods for building like utilising modules), making the procedure less laborious and time-intensive the multi-story structures are built utilising modules that are manufactured off-site and then assembled vertically on-site. Typically, the modules make up a level of the multi-story structures. Notably, the modules are put together to create the multi-story structure and further are aligned with one another. In other words, the modules are normally arranged in a straight line, starting at the bottom and ending at the top.

Conventionally, steel structures are used in modules to connect the walls and roofs with the exterior frames. The steel structures restrict movement between the walls and exterior frames. Furthermore, the wall have a chance to break easily by the external loads caused during transportation and earthquakes. The loads due to transportation, during the building and use of the structures, and due to earthquakes needs to be transferred uniformly to the ground to provide robustness. However, the walls, exterior frames and roof take the larger load before transferring it to the ground. The load transfer through exterior frames cause damage and also affects the robustness of the multi-story structures as a whole. Moreover, due to the application of load the steel structures collides with the wall, exterior frames and roof.

Typically, the wall structures of the modules are one package where the load-bearing structure is part of the overall wall structure (in addition to the load-bearing structure, insulation and surface materials). There is therefore a risk of the surface materials breaking if they all have one and the same continuous and "rigid" structure. To reduce the risk, the load-bearing structures must be dimensioned so rigid (and at the same time expensive) that deformations remain small enough. The alternative is to accept the risk and repair any damage after installation.

Traditionally, wall structures have been made as a single package, where the plating of the inner surfaces has the risk of breakage if the module experiences during transport or use the deformations too large for the structure. In the "one package structure", the steel structure does not collide with the walls or ceiling, etc. as such, because they really are one and the same continuous entity.

Therefore, in the light of the foregoing discussion, there exists a need to overcome the aforementioned drawbacks associated with the conventional multi-story structures.

SUMMARY

The present disclosure seeks to provide a volumetric building unit. The present disclosure also seeks to provide a method for manufacturing a building unit. The present disclosure also seeks to provide a modular building (a building assembled of building units). An aim of the present disclosure is to provide a solution that overcomes at least partially the problems encountered in prior art.

In first aspect, an embodiment of the present disclosure provides a volumetric building unit comprising:
  a support frame having a plurality of support frame members, and the support frame is configured to be a primary load bearing structure for the volumetric building unit;
  a plurality of modular interior wall units coupled interiorly to the plurality of support frame members of the support frame in a spaced apart manner to form interior walls of the volumetric, building unit, wherein
  a plurality of modular interior ceiling units are arranged on the plurality of modular interior wall units to form the interior ceiling of the volumetric, building unit; and
  a plurality of modular floor units are arranged on the support frame to form the floor of the volumetric, building unit; and
  wherein
  the spaced apart coupling between the support frame and the interior walls and interior ceiling provides flexibility between the support frame and the interior wall and interior ceiling, so that the deformation of the support frame within a predetermined range is not transmitted to the interior wall and/or interior ceiling.

In second aspect, an embodiment of the present disclosure also provides a method for manufacturing a building unit, the method comprising:
  forming a support frame using a plurality of support frame members, and the support frame is configured to be a primary load bearing structure for the building unit;
  coupling a plurality of interior wall units interiorly to the plurality of support frame members of the support frame in a spaced apart manner,
  arranging a plurality of modular interior ceiling units on the plurality of modular interior wall units to form the interior ceiling of the building unit;
  arranging a plurality of floor units on the support frame to form floor of the building unit; wherein
  the spaced apart coupling between the support frame and the interior walls and interior ceiling provides flexibility between the support frame and the interior wall and interior ceiling, so that when subjecting the support frame to own mass and/or external loads the deformation of the support frame within a predetermined range is not transmitted to the interior wall and/or interior ceiling.

In third aspect, an embodiment of the present disclosure also provides a building wherein the building comprises one or more building units according to the first aspect.

Embodiments of the present disclosure substantially eliminate or at least partially address the aforementioned problems in the prior art, and enables consistent quality for constructing building unit at low cost and less time thereby saving labour cost, material for fabrication, and further optimizing the structural robustness thereof. The volumetric, building unit do have a gap between the support frame and internal walls which can prevent from the damages caused during transportation, use of the building and earthquakes.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In first aspect, an embodiment of the present disclosure provides a volumetric, building unit comprising:
   a support frame having a plurality of support frame members, and the support frame is configured to be a primary load bearing structure for the volumetric, building unit;
   a plurality of modular interior wall units coupled interiorly to the plurality of support frame members of the support frame in a spaced apart manner to form interior walls of the volumetric, building unit, wherein
   a plurality of modular interior ceiling units are arranged on the plurality of modular interior wall units to form the interior ceiling of the volumetric, building unit; and
   a plurality of modular floor units are arranged on the support frame to form the floor of the volumetric, building unit; and
   wherein
   the spaced apart coupling between the support frame and the interior walls and interior ceiling provides flexibility between the support frame and the interior wall and interior ceiling, so that the deformation of the support frame within a predetermined range is not transmitted to the interior wall and/or interior ceiling.

In second aspect, an embodiment of the present disclosure provides a method for manufacturing a building unit, the method comprising:
   forming a support frame using a plurality of support frame members, and the support frame is configured to be a primary load bearing structure for the building unit;
   coupling a plurality of interior wall units interiorly to the plurality of support frame members of the support frame in a spaced apart manner,
   arranging a plurality of modular interior ceiling units on the plurality of modular interior wall units to form the interior ceiling of the building unit;
   arranging a plurality of floor units on the support frame to form floor of the building unit; wherein
   the spaced apart coupling between the support frame and the interior walls and interior ceiling provides flexibility between the support frame and the interior wall and interior ceiling, so that when subjecting the support frame to own mass and/or external loads the deformation of the support frame within a predetermined range is not transmitted to the interior wall and/or interior ceiling.

In third aspect, an embodiment of the present disclosure also provides a modular building wherein the modular building comprises one or more building units according to the first aspect.

The present disclosure provides the volumetric, building unit fabricated in a manner to save labour cost, material for fabrication, and optimizing the structural robustness thereof. Herein, the plurality of modular interior wall units and the plurality of interior ceiling units are attached in a flexible manner to the support frame to enable movement therebetween, thus increases the robustness of the volumetric, building unit that are fabricated off site or on site. Suitably, spacers or washers are used to establish coupling between the plurality of modular interior wall and interior wall-studs.

Throughout the present disclosure, the term "building unit" as used herein refers to an assembly of prefabricated sections arranged together to form a module of the building. Optionally, the prefabricated sections have similar architectural layout. Optionally, the prefabricated sections have dissimilar architectural layout. Specifically, the volumetric, building units (also referred as building units) can be constructed off-site, in other words, away from a site where the building is to be constructed. Furthermore, the volumetric, building units are assembled or installed on the site where the building is to be constructed. Optionally, the volumetric, building units are placed in a defined configuration such as, for example, end-to-end, side-by-side, stacked, and so forth, thereby allowing a plurality of designs and layouts for the volumetric, building unit. Such configuration of the prefabricated sections is further securely affixed using connecting means to construct the volumetric, building unit.

It will be appreciated that the volumetric, building unit may be a permanent establishment or a temporary establishment. Subsequently, a material required for construction of the volumetric building unit vary based on a type of establishment thereof. Additionally, optionally, the volumetric, building units are constructed in a controlled environment of, for example, assembly lines. Moreover, optionally, the modules of the volumetric, building unit may be constructed using at least one of: wood, steel, plastic, laminates, ceramics and so forth. Examples of the volumetric, building unit include, but are not limited to, a house (for example, such as a bungalow, a villa, and the like), a housing complex (for example, a multi-storey structure having multiple apartments), an animal shelter, a fort, a tower, a hotel, a place of worship (for example, such as a temple, a church, and the like), a place of recreation (for example, such as a gymnasium, a community hall, a clubhouse and the like), a hospital, a commercial establishment (for example, such as a shop, a shopping mall, an office premises and the like) and an industrial establishment (for example, such as a factory, a warehouse and the like).

The volumetric, building unit has certain pre-defined dimensions such as height, width, and depth, and further pre-defined thickness for the corresponding floor, roof and walls. In an instance, the volumetric, building unit may be a part of a living room, store room, kitchen, lavatory, hall, workspace, bathroom, elevator, or any other structure of the building. The building unit may have specific shape, size and features, based upon its purpose. Additionally, the volumetric, building unit may further include supporting elements to provide functional and/or structural support thereof. Such supporting architectural elements may include doors and windows, technical installations and furniture equipment, finishing, ventilation structures, inlets, outlets and the like.

Furthermore, the building unit comprises the support frame. The term "support frame" as used herein refers to a solid framework that provides a rigid enough support to the building unit. The support frame is the skeleton arrangement in a regular, repeating arrangement to support the building unit. The support frame includes components extending vertically (for example to a predefined height or width) and horizontally (for example to a predefined depth). The support frame is formed by assembling together the vertical component and the horizontal components using the connecting means. In an instance, the vertical components may support the walls, and the horizontal components may form the roof and the floor of the building unit. In an instance, the support frame of the building unit is arranged to have a cross-beam structure to provide robustness to the building unit.

Optionally, the support frame is composed of at least one of a metal, a non-metal, an alloy, or a combination thereof. Examples of metallic materials used for fabricating the support frame include but not limited to, aluminium, lead, tin, zinc, copper, and iron. Alloys used for fabricating the support frame include but not limited to nickel alloys such as nickel silver, Monel metal, stainless steel, and so forth, copper alloys such as bronze, brass, and so forth, and iron alloys such as wrought iron, cast iron, sheet iron, steel and so forth.

Furthermore, the support frame comprises the plurality of support frame members. It will be appreciated that the term "support frame member" as used herein refers to a collection of elements for holding and supporting the support frame, in a certain position. Subsequently, the support frame members are the units of the support frame. The support frame members are the building blocks of the building unit. Notably, the building unit may comprise 'n' number of support frame members therein, wherein $n >= 1$. Optionally, the number of support frame members in the building unit can vary with the requirements. Pursuant to embodiments of the present disclosure, the plurality of support frame members are arranged along with the volumetric, building unit.

The support frame members are configured to be a primary load bearing structure for the building unit in at least one of the horizontal and the vertical directions. The support frame of the building unit is arranged to bear the external load and provide support to the building unit. More optionally, the support frame members may have a different function associated thereto such as, to provide stiffness and strength to the volumetric, building unit in order to resist the external load. The term "primary load" as used herein refers to an amount of weight or load applied on the volumetric, building unit. Optionally, the support frame is configured to be the primary load-bearing structure based on a number of floors and building construction parameters including at least one of: structural masses, structural loads, live loads, environmental loads or any combination of the aforementioned. In this regard, the primary load bearing increases based on the number of floors and types of a room on the floor in the volumetric, building units. Additionally, the parameters such as width, length, and height of the volumetric, building units also increase the primary load. Notably, the structural mass load can be structure or action loads such as forces, deformation, or acceleration applied to a structure or its component. For example, the self-weight of the volumetric, building unit, such as interior wall units, interior ceiling unit, floors and the like. The structural loads may also include the load of the windows, doors and the like which are permanently attached to the volumetric, building unit. Furthermore, the live loads include the loads which change over time such as people walking around and movable furniture in the volumetric, building unit. Furthermore, the live loads are variable and depends on the usage and capacity of the volumetric, building unit. Additionally, the environmental load is caused by the wind, waves, current, rain, soil and hydrostatic pressure, earthquake and other external forces on the volumetric, building unit.

Notably, due to primary load the support fame experience deformation thereof. Optionally, the deformation is in range of 1/1000 to 5/1000, i.e 1 to 5 per millimeter. More optionally, the deformation is in the range of 2 to 3 per millimeter (i.e 2/1000-3/1000). The deformation depends on the size of the support frame (such as length and height of the support frame). It will be appreciated that the deformation occurs due to the application of the load acting horizontally, or vertically on the support frame (on the vertical parts of the support frame or on the sides of the support frame). For example, the wind force is generating force and deforming the support frame, usually occurs when the wind pushes practically the outer/external walls or wall unit, which is/are fastened or connected to the support frame. The inner walls are practically protected from the wind, but the own weight of the inner walls and also the seismic loads do affect the inner walls. The deformation can happen because of any of structural masses, structural loads, live loads, environmental loads or any combination of the aforementioned.

The volumetric, building unit comprises the plurality of modular interior wall units coupled interiorly to the plurality of support frame members of the support frame in a spaced apart manner to form interior walls of the building unit. The term "wall unit" as used herein refers to a vertical structure that is configured to enclose a volume or divide an area in the volumetric, building unit. Notably, the plurality of modular interior wall unit has defined dimensions (such as height, width and depth). Furthermore, the plurality of modular interior wall units have length (d), width (w) and height (h). Optionally the plurality of modular interior wall units may have a cuboidal shape. The term "ceiling unit" as used herein refers to a horizontal structure that is configured to enclose the plurality of modular interior wall units. The term "floor unit" as used herein refers to a horizontal structure that is configured to the bottom surface of the volumetric, building unit. The plurality of modular floor units and the plurality of modular interior ceiling units are arranged to be mutually parallel to each other, and mutually opposite to each other in a horizontal plane. Each of the plurality of modular interior wall units is arranged mutually perpendicular to the plurality of modular interior ceiling units and the plurality of modular floor units. Furthermore, each of the plurality of modular interior ceiling units is arranged in a horizontal plane, wherein the vertical plane is perpendicular to the horizontal plane.

Furthermore, the volumetric, building unit requires at least four modular interior wall units and one modular interior ceiling unit and one modular floor unit. Each of the plurality of modular interior wall units are arranged in a vertical plane. It will be appreciated that the plurality of modular interior ceiling units and the plurality of modular floor units might be identical. Furthermore, the four modular interior wall units might be also identical and conform to the shape of a cuboid. Additionally, when the length and the width of the plurality of modular interior wall units, the plurality of modular interior ceiling units and the plurality of modular floor units are identical the building unit confirms the shape of a cube. Optionally, the plurality of modular interior wall units, the plurality of modular interior ceiling units and the plurality of modular floor units may or may not be identical depending upon the architectural design of the volumetric, building unit.

Furthermore, the plurality of modular interior wall units are coupled interiorly to the plurality of the support frame. The plurality of modular interior wall units are supported through the plurality of support frames which bears the primary load of the plurality of modular interior wall units and provide the volumetric, building unit. The plurality of modular interior wall units are coupled in such a way that there is a space between the plurality of modular interior wall units of the volumetric, building unit and the support frames of the volumetric, building unit. Beneficially, the space between the plurality of support frame members and the plurality of modular interior wall units provides flexibility to the building unit during the application of primary loads such as during transportation and earthquakes and prevents the plurality of modular interior wall units from breaking.

Furthermore, the plurality of modular interior ceiling units are configured as a ceiling of the volumetric, building unit. The plurality of modular interior ceiling units are arranged on top of the plurality of modular interior wall units to form the ceiling of the building unit. It will be appreciated that the plurality of modular interior ceiling units is placed on the plurality of modular interior wall units by the plurality of support frame members of the support frame. Notably, the plurality of modular interior ceiling unit corresponds and overlay on the upper surface of the plurality of modular interior wall units and is affixed together using connecting means.

Notably, the plurality of modular floor units are arranged on the support frame to form the floor or the lower surface of the building unit. The plurality of modular floor units is connected to the plurality of modular interior wall units. The plurality of modular interior wall units are vertically attached through the plurality of modular floor units through the plurality of support frames and on the top of the plurality of modular floor units.

Notably, to the "empty" support frame are first applied the floors units, then on top of the floors the inner walls are applied and then the inner walls are applied on top of the inner walls.

Optionally, the spaced apart coupling between the plurality of modular interior wall units and the plurality of support frame members is enabled by at least one spacer or washer coupled using at least one of: fasteners or adhesive pads or glue or combination of the aforementioned. In this regard, the at least one spacer or washer is arranged in the spaced apart manner.

Moreover, the at least one spacer or washer is arranged to provide flexibility between the plurality of support frame member and the plurality of modular interior wall units.

The term "spacer" as used herein refers to a device or element used to create or maintain a desired amount of space between the plurality of modular interior wall units and the plurality of support frame members. Notably, the at least one spacer is configured to distribute (or distributes only partially) the primary load which is established on the support frame during transportation, earthquake or due to any other cause.

Furthermore, the washer may be fabricated from at least one of steel, aluminium, copper, brass, bronze, zinc, plastic or the combination thereof. Notably, the fastener or adhesive pads is permanently or non-permanently affixed to the plurality of modular interior wall units to the plurality of support frame members of the support frame. For example, the at least one spacer may be a nut, bolt, screw, rivet, nail, retaining ring and the like.

Optionally, the spaced apart coupling between the plurality of modular interior walls and the plurality of support frame members is in the range of 5 millimetre to 25 millimetre. The spaced apart coupling between the plurality of modular interior walls and the plurality of support frame members may be from 5, 10, 15, or 20 mm up to 10, 15, 20 or 25 mm. Furthermore, the plurality of modular interior wall units supported by the plurality of support frame members by the at least one spacer or washer to allows relative movements between the plurality of modular interior wall units and the plurality of support frame members of the support frame. The spacing between the support frame and the plurality of modular interior wall units provides an air gap therebetween which varies with the application of primary load on the volumetric, building unit. The air gap further helps in increasing the flexibility of the volumetric, building unit.

Optionally, the building unit further comprises a plurality of exterior wall-covers coupled exteriorly to the support frame members of the support frame to form an exterior surface or envelope or a facade of the building unit. The term "exterior cover" as used herein refers to an outer surface attached exteriorly to the support frame of the volumetric, building unit forming the exterior wall unit. Furthermore, the exterior wall-covers may be made up of the concrete, cement, gypsum wallboard, steel, tiles, porcelain, aluminium composites and the like. The plurality of exterior wall-covers protects the volumetric, building unit from the outside and bears the external load first due to transportation and earthquakes and the like. Furthermore, the plurality of exterior wall-covers transfers the primary load to the support frame members of the support frame, which bears the primary loads and prevents from transferring to the plurality of modular interior wall units.

Optionally, each of the plurality of modular interior wall units comprises:
a plurality of wall-studs arranged in a spaced apart manner,
a plurality of interior wall-covers coupled interiorly to the plurality of wall-studs,
a plurality of insulation layers arranged in a space between the plurality of wall-studs, the plurality of interior wall-covers and the plurality of exterior wall-covers.

The term "wall-stud" as used herein refers to vertical beams that support the modular interior wall units from the inside. Notably, the plurality of wall-studs from outside connected with the exterior wall-covers of the volumetric, building unit. The plurality of wall-studs are made up of wood or metal (such as aluminium, copper, brass, bronze and the like) and are used to hold the plurality of exterior wall-covers and the plurality of modular interior wall units. Furthermore, the plurality of wall-studs also provides support to the fasteners and washers better than the exterior wall-covers and the plurality of modular interior wall units. Furthermore, the plurality of interior wall-covers are coupled interiorly to the plurality of wall-studs. Herein the term "interior wall-cover" as used herein refers to a panel which are fitted within the interior wall unit. Optionally, the plurality of interior wall-covers is made up of gypsum, Cement fiber board, OS-Board, Plywood board, laminate, or laminated board and the like, practically of any suitable board. Furthermore, the plurality of interior wall-covers are used to provide insulation from the surroundings.

Additionally, the plurality of exterior wall-covers are coupled exteriorly to the plurality of wall-studs. Notably, the plurality of modular wall units comprises three layers, interior wall-covers, exterior wall-covers and the plurality of insulation layers. Optionally, the first layer is the plurality of interior wall-covers, which can be made up of plasterboards, and after that an insulation layer which prevents from fire and works as acoustic barrier, and serves for thermal protection. Subsequently, the plurality of exterior is directly coupled with the plurality of support frame members by at least one of the fasteners or adhesive pads or glue Additionally, the plurality of insulation layers made up of mineral fibre, Fiberglass, cellulose, Polystyrene, mineral wool, Polyurethane foam, and so forth are arranged in space between the plurality of wall-studs, the plurality of interior wall-covers and the plurality of exterior wall-covers. The plurality of insulation layers might be glued at the joints and fastened to the plurality of wall-studs. It can also be that the insulation layers are not at all fastened. Additionally, optionally, each of the plurality of insulation layers is circumscribed inside the plurality of interior wall-covers. Optionally, the plurality of insulation layers provides electrical and thermal protection to each of the plurality interior wall-covers, thereby enabling safe operation of the plurality of modular interior wall units.

Optionally, each of the plurality of modular interior wall units further comprises an interior ceiling support member arranged at least partially on top of the plurality of wall-studs. The term "ceiling support member" as used herein refers to a support system that is configured to provide support to the plurality of modular interior ceiling units and fixes it to the volumetric, building unit. Notably, the interior ceiling edge of the volumetric, building unit is supported on the upper edge of the modular interior wall unit by the ceiling support member. The ceiling support member bears the weight of the interior ceiling unit. Additionally, fire retardant joints may be used to maintain the volumetric, building unit safety. Notably, each of the plurality of modular interior ceiling units and the plurality of modular interior wall units are connected which provides space and flexibility for the volumetric, building unit.

Optionally, the plurality of interior ceiling units is supported by the interior ceiling support member, leaving a gap between the plurality of modular interior ceiling units and the plurality of support frame members. In this regard, the plurality of interior ceiling units are connected to the plurality of modular interior wall units using fasteners or adhesive pads or glue. Notably, the plurality of interior wall ceiling units optionally are provided with the holes such that the dimension of the holes corresponds to that of the fasteners or adhesive pads or glue. Optionally, the fastening of the plurality of interior wall ceiling units is done in such a way that there is a gap between the edges of the plurality of interior wall ceiling units and the plurality of support frame members of the plurality of interior modular wall units. Notably, the gap between the plurality of interior ceiling units and the plurality of support frame members allows protection against shock and vibrations by minimizing the effect of the primary load thereupon. Beneficially, the gap isolates shocks, vibrations and stress thereby preventing damage of material or layers below it. The gap between the plurality of interior ceiling units and the plurality of support frame members provides protection against forces due to lifting and placement of the plurality of interior ceiling units and other external forces such as earthquakes, and the like.

Optionally, the plurality of wall-studs includes one or more openings or conduits (conduits are inside the studs) configured to enable electrical, plumbing connection. In this regard, the plurality of wall-studs (walls) have multiple openings or conduits, each openings or conduit are configured to enable electrical wiring, plumbing connection and the like. The openings provide the space for example for sockets, outfitting, switches and sensors. Furthermore, the openings or conduits is operable to allow the pipes to pass therethrough, such that installation and wirings can be done.

Optionally, the building unit further comprises a plurality of interior wall joints configured to couple two modular interior wall units. In this regard, the plurality of the modular interior wall units are joined together using the plurality of interior wall joints. Optionally, the plurality of interior wall joints may be selected but not limited to fiberglass tape or fiberglass paper, aluminium components, rubber, gasket covers, mechanical connectors, fasteners, adhesives and the like. The plurality of interior wall joints enable the building of a inner space provides support and strength to the walls/wall units.

Optionally, the building unit further comprises architectural elements (doors and windows), technical installations and furniture, fixtures, equipment, finishings). The term "architectural element" as used herein refers to elements which can be installed in the building unit. Typically, the architectural elements may be doors windows and the like. Moreover, the term "technical installations" refers to the sensor and other mechanical or electrical installations. The technical installations may be thermal sensors, humidity sensors, light fixture, battery, television, electric fan, ventilation fans, air, conditioner, PV panels, motion sensor illuminance sensor, electric power meter, gas meter, water meter and the like.

The present disclosure also relates to the method for manufacturing a building unit as described above. Various embodiments and variants disclosed above apply mutatis mutandis to the method for manufacturing a building unit.

Optionally, the spaced apart coupling between the plurality of interior walls and the plurality of support frame members is enabled by at least one spacer or washer coupled using at least one of: fasteners or adhesive pads.

Optionally, the method further comprising coupling a plurality of exterior covers exteriorly to the plurality of support frame members of the support frame to form an exterior surface or envelope or a facade of the building unit.

Optionally, each of the plurality of modular wall units comprises:
arranging a plurality of wall-studs in a spaced apart manner,
coupling a plurality of interior wall-covers interiorly to the plurality of wall-studs,
coupling a plurality of exterior wall-covers exteriorly to the plurality of wall-studs, and
arranging a plurality of insulation layers in a space between the plurality of wall-studs, the plurality of interior wall-covers and the plurality of exterior wall-covers.

The present disclosure also relates to the modular building as described above. Various embodiments and variants disclosed above apply mutatis mutandis to the modular building.

DETAILED DESCRIPTION OF THE DRAWINGS

Figure 1:
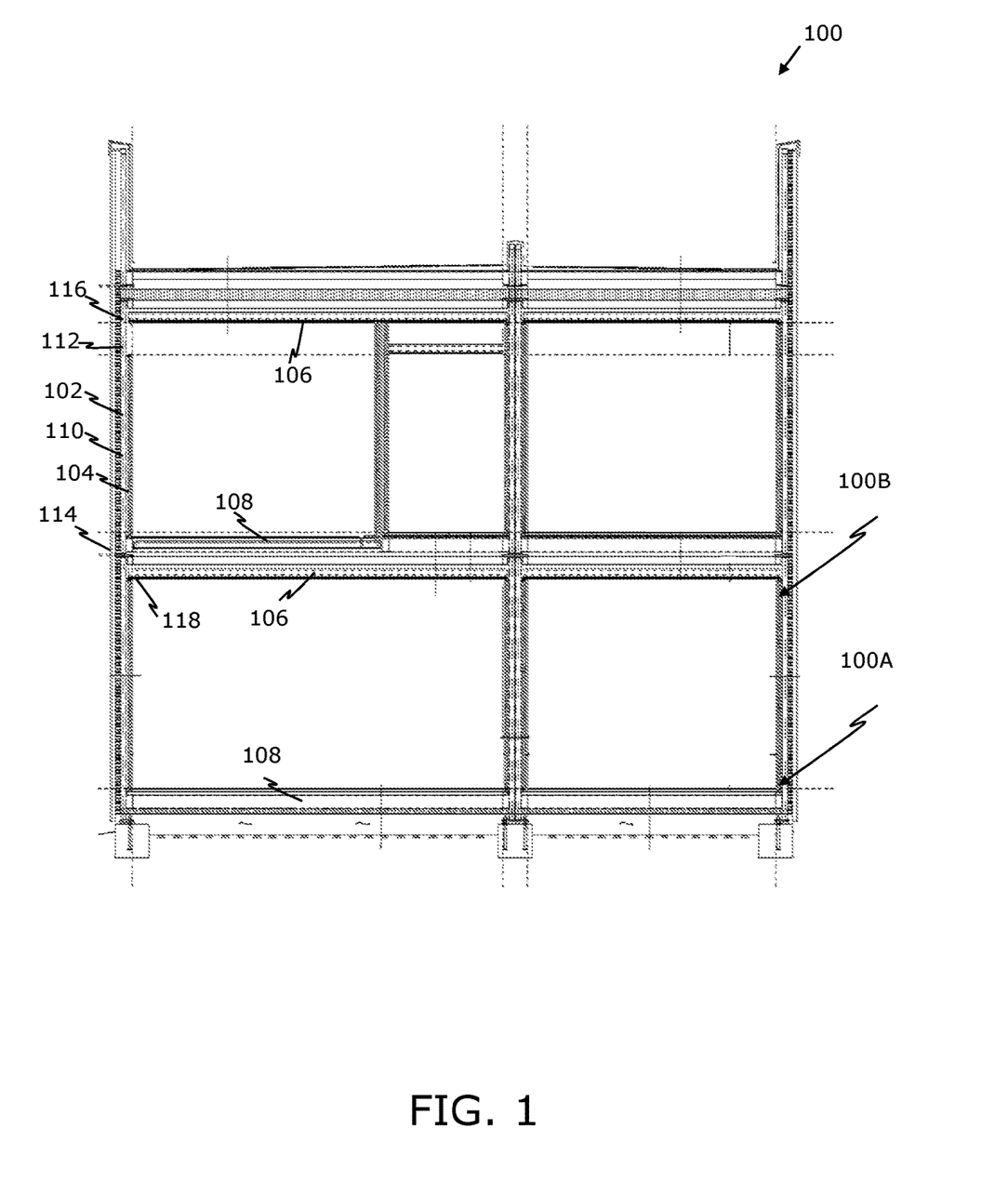
FIG. 1 is a schematic illustration of a modular building, in accordance with an embodiment of the present disclosure.

Referring to FIG. 1, there is shown a schematic illustration of a modular building 100, in accordance with an embodiment of the present disclosure. As shown, the modular building 100 having a first building unit 100A and a second building unit 10013, comprising a support frame 102, a plurality of modular interior wall units 104, a plurality of modular interior ceiling units 106 and a plurality of modular floor units 108. Furthermore, the support frame 102 have a plurality of support frame members 110, and the support frame is configured to be the primary load bearing structure for the modular building 100. The plurality of modular interior wall units 104 coupled interiorly to the plurality of support frame members 110 of the support frame 102 in a spaced apart manner to form interior walls of the modular building 100. The plurality of modular interior ceiling units 106 are arranged on the plurality of modular interior wall units 104 to form the interior ceiling of the modular building 100. Moreover, the plurality of modular floor units 108 are arranged on the support frame 102 to form the floor of the modular building 100. Notably, the spaced apart coupling between the support frame 102 and the interior walls 104 and interior ceiling 106 provides flexibility between the support frame 102 and the interior wall 104 and interior ceiling 106, so that the deformation of the support frame 102 within a predetermined range is not transmitted to the interior wall 104 and/or interior ceiling 106.

Moreover, the spaced apart coupling between the plurality of modular interior wall units 104 and the plurality of support frame members 110 is enabled by at least one spacer or washer 112 coupled using at least one of: fasteners or adhesive pads or glue or combination thereof. Herein the spaced apart coupling between the plurality of the plurality of modular interior wall units 104 and the plurality of support frame members 110 is in the range of 5 millimetre to 25 millimetre. Furthermore, the modular building 100 comprises a plurality of exterior wall-covers 114 coupled exteriorly to the plurality of support frame members 110 of the support frame 102 to form an exterior surface or envelope or a facade of the modular building 100.

Figure 2A:
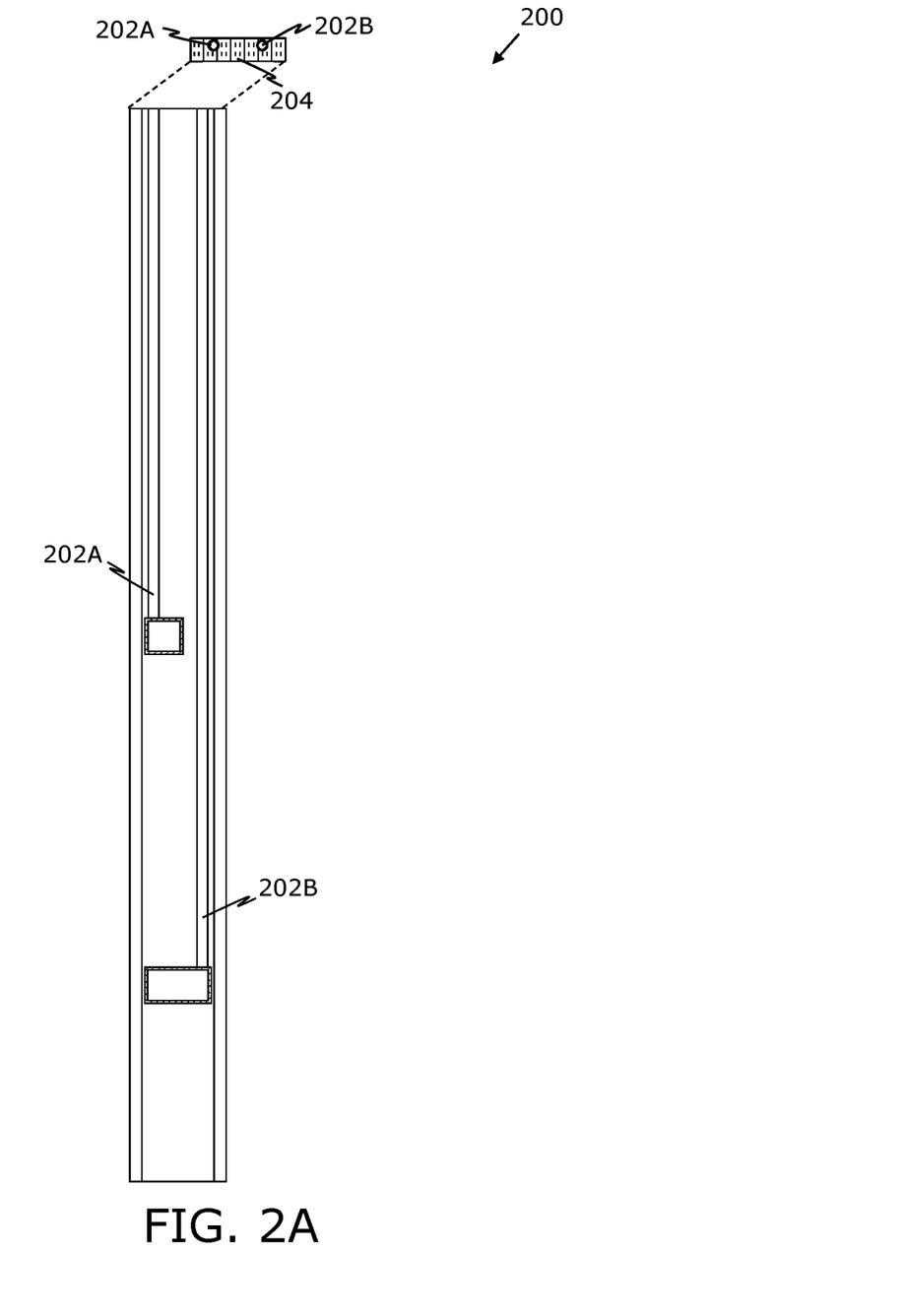
FIGS. 2A and 2B are an exemplary illustration of a wall-stud depicting a front view and a top view, respectively, in accordance with an embodiment of the present disclosure.
Figure 2B:
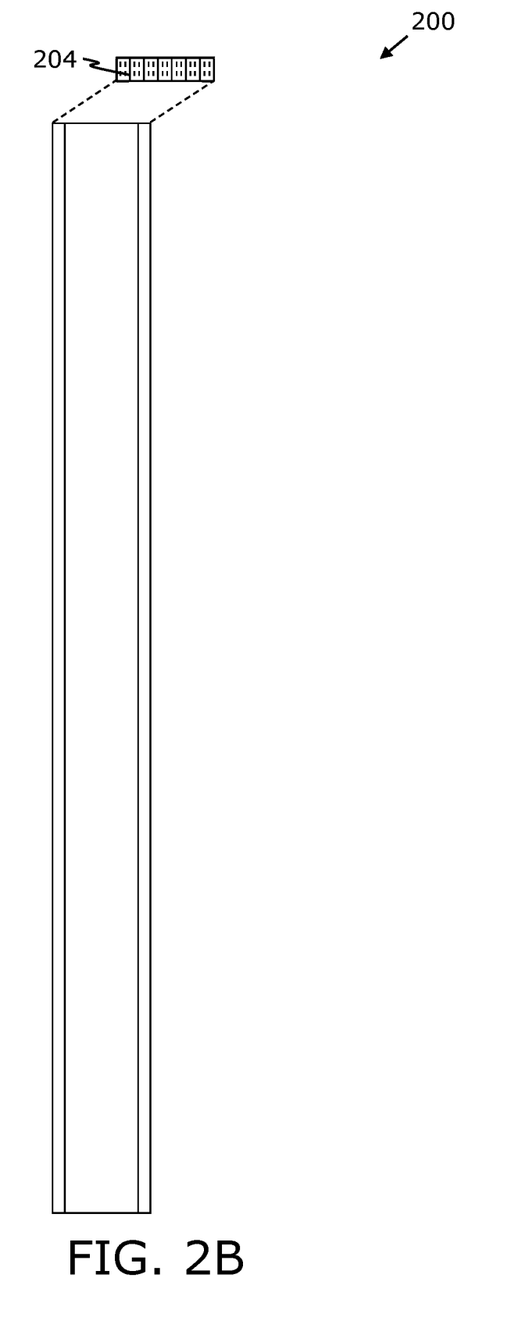

Additionally, each of the plurality of modular interior wall units further comprises an interior ceiling support member 116 arranged at least partially on top of a plurality of wall-studs 118 (as shown in FIGS. 2A and 2B).

Referring to FIGS. 2A and 2B, are an exemplary illustration of a wall-stud 200 depicting a front view and a top view, respectively, in accordance with an embodiment of the present disclosure. As shown in FIG. 2A, the wall-stud 200 includes one or more openings or conduits 202A-B and a plurality of insulation layer 204, arranged in a space between the wall-stud 200. As shown in FIG. 2B, the wall-stud 200 is filled with a plurality of insulation layer 204, arranged in a space between the wall-stud 200. Herein, the wall-stud 200 may comprise one or more openings or conduits 202A-B (shown in FIG. 2A).

It may be understood by a person skilled in the art that the FIGS. 2A and 2B are merely an example, which should not unduly limit the scope of the claims herein. The person skilled in the art will recognize many variations, alternatives, and modifications of embodiments of the present disclosure.

Figure 3A:
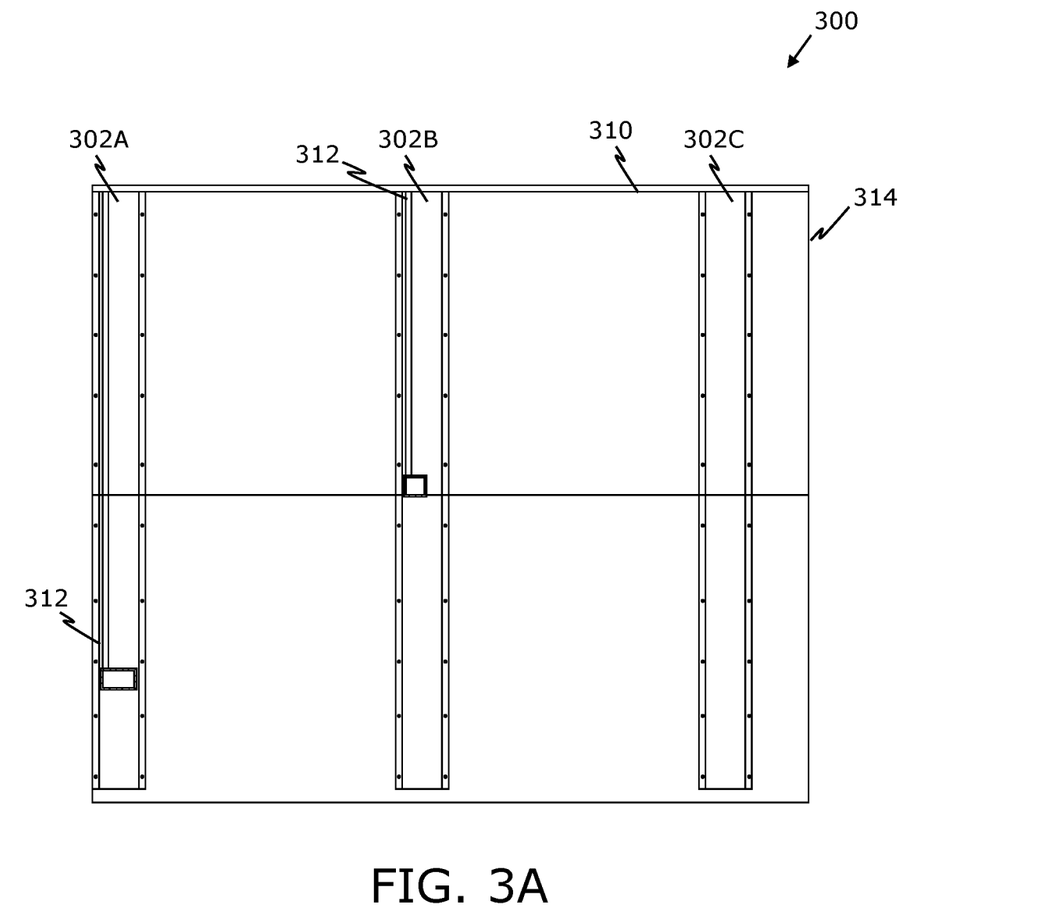
FIGS. 3A and 3B are schematic illustrations of a modular interior wall unit depicting a front view and a top view respectively, in accordance with an embodiment of the present disclosure.
Figure 3B:
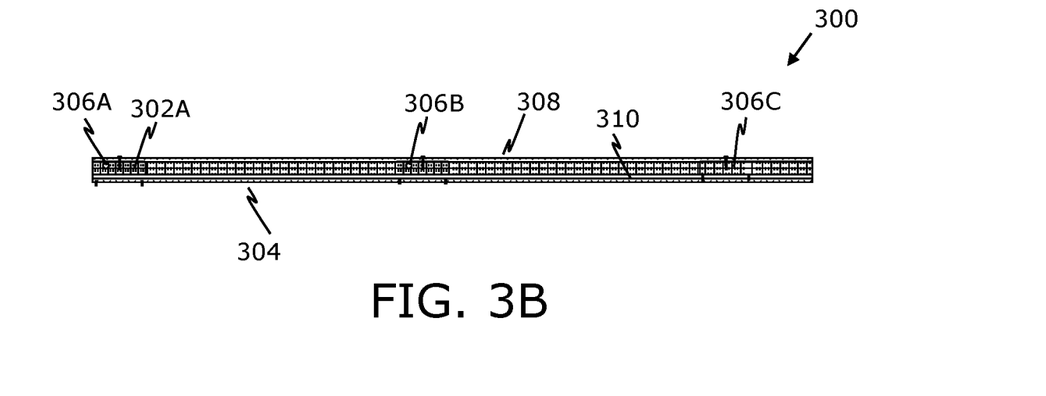

Referring to FIGS. 3A and 3B, are schematic illustrations of a modular interior wall unit 300 depicting a front view and a top view, respectively, in accordance with an embodiment of the present disclosure. As shown in FIG. 3A, the modular interior wall unit 300 comprises a plurality of wall-studs 302A-C. The modular interior wall unit 300 further comprises an interior wall-covers 304, a plurality of insulation layers 306A-C and an exterior wall-covers (as shown in FIG. 3B). Furthermore, the plurality of wall-studs 302A-C are arranged in a spaced apart manner. Furthermore, the interior wall-covers 304 interiorly to the plurality of wall-studs 302A-C. Additionally As shown in FIG. 3B, the plurality of insulation layers 306A-C arranged in a space between the plurality of wall-studs 302A-C, the wall-covers 304 and the exterior wall-covers 308. The exterior wall-covers 308 coupled exteriorly to the plurality of support frame members of the support to enable to apply an exterior surface or envelope or a facade of the building unit. Furthermore, the modular interior wall units 300 further comprises an interior ceiling support member 310 arranged at least partially on top of the plurality of wall-studs 302A-C. Furthermore, the plurality of wall-studs 302A-C includes one or more openings or conduits 312 configured to enable electrical, plumbing connection. Furthermore, a plurality of interior wall joints 314 is configured to couple two modular interior wall units 300.

Figure 4:
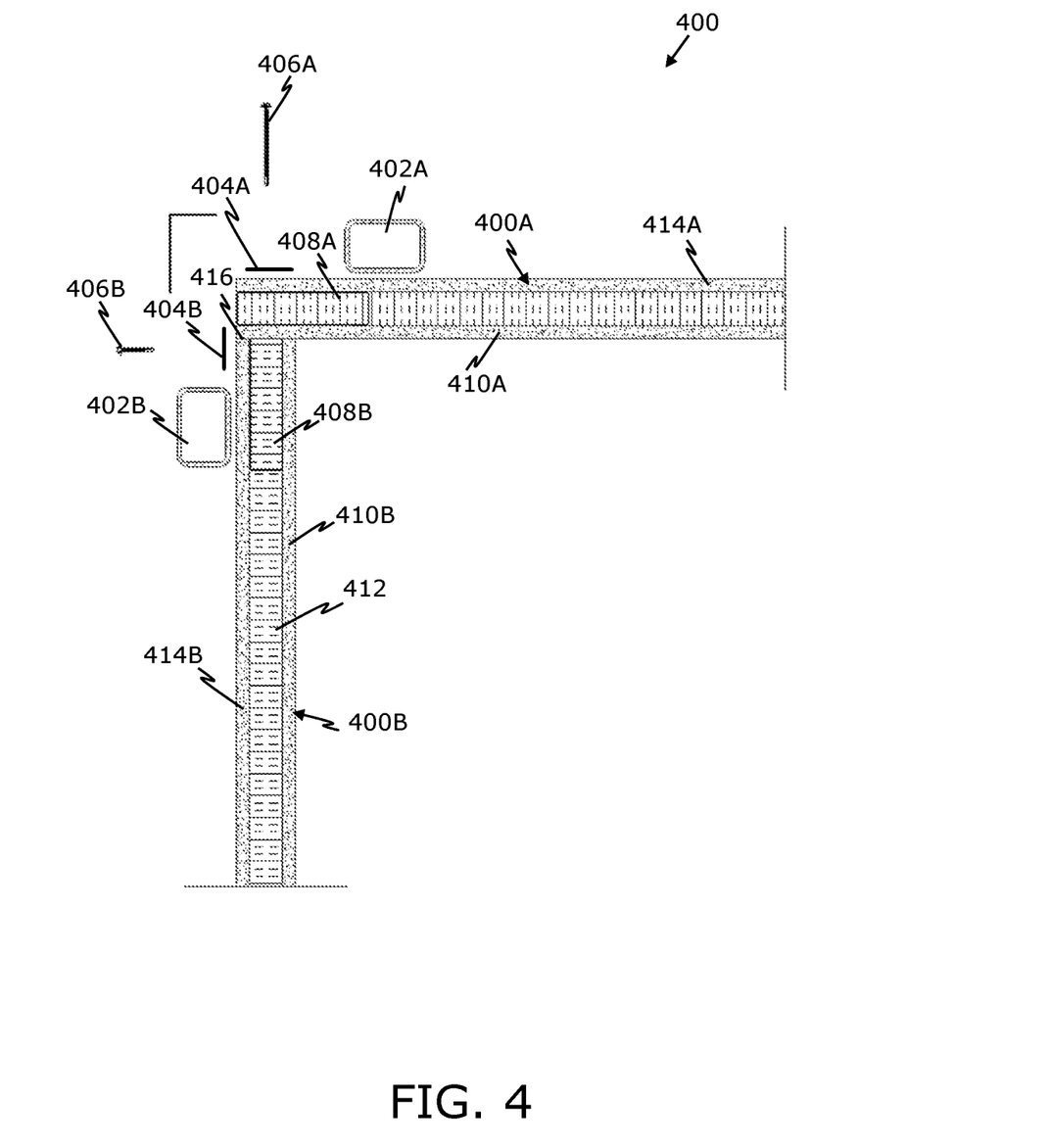
FIG. 4 is a schematic illustration of a plurality of modular interior wall units, in accordance with an embodiment of the present disclosure.

Referring to FIG. 4, there is shown a schematic illustration of a plurality of modular interior wall units 400 (depicted as a first modular interior wall unit 400A and a second interior modular wall unit 400B), in accordance with an embodiment of the present disclosure. As shown, the first modular interior wall unit 400A and the second interior modular wall unit 400B is coupled interiorly to the support frame 402 through a plurality of support frame members 402A-B in a spaced apart manner. Moreover, the first modular interior wall unit 400A and the second modular interior wall unit 400B are perpendicularly adjacent to each other and the corners are joined together without spacing. Moreover, the spaced apart coupling between the plurality of the modular interior wall units 400 and the plurality of support frame members 402A-B is enabled by at least one spacer or washer 404A-B coupled using at least one fasteners or adhesive pads or glue 406A-B or combination thereof. Furthermore, the first modular interior wall unit 400A and the second modular interior wall unit 400B comprises a plurality of wall-studs 408A-B arranged in a spaced apart manner, joined together through the at least one fasteners or adhesive pads or glue 406A-B. As shown, a plurality of interior wall-covers 410A-B coupled interiorly to the plurality of the wall-studs 408A-B respectively, an insulation layers 412 arranged in a space between the plurality of wall-studs 408A-B, the plurality of interior wall-covers 410A-B and a plurality of exterior wall-covers 414A-B. Furthermore, an interior wall joints 416 configured to couple the first modular interior wall unit 400A and the second interior modular wall unit 400B.

Figure 5:
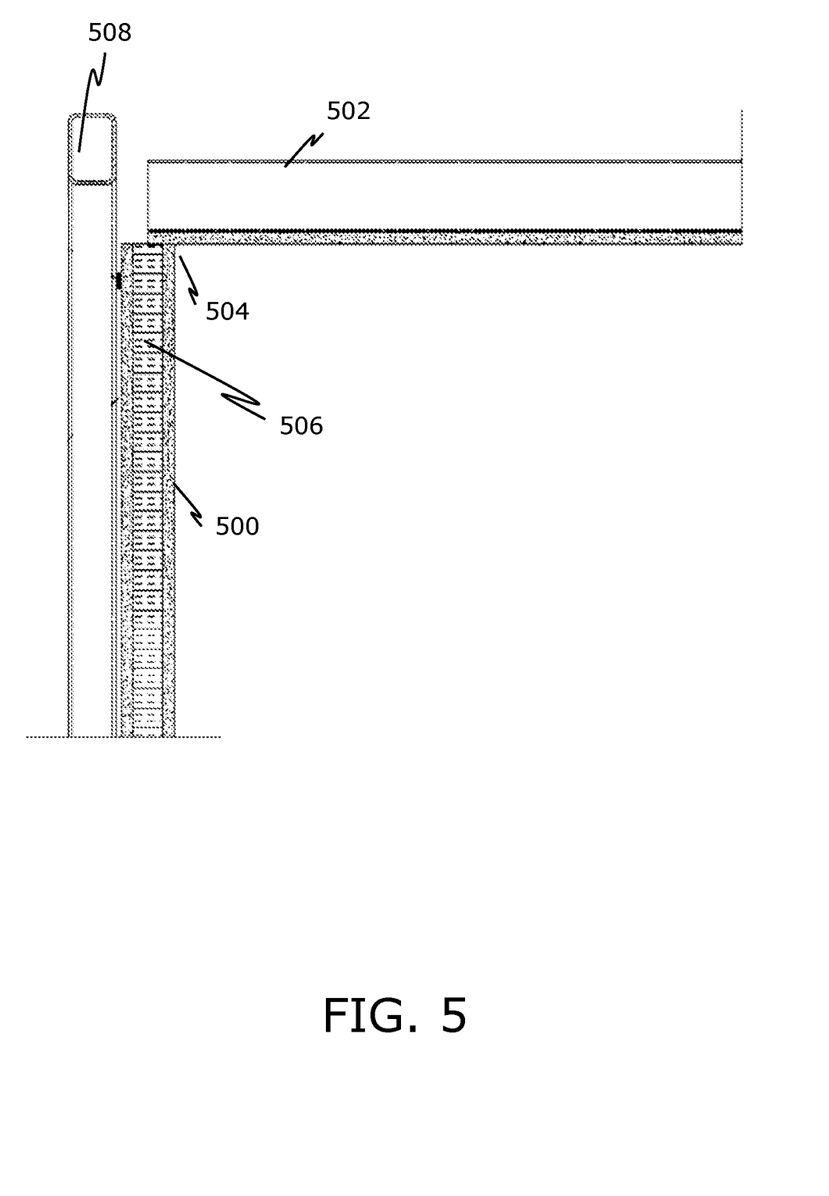
FIG. 5 is schematic illustration of an arrangement of a modular interior wall unit and a modular ceiling unit, in accordance with an embodiment of the present disclosure.

Referring to FIG. 5, there is shown a schematic illustration of an arrangement of a modular interior wall unit 500 and a modular ceiling unit 502, in accordance with an embodiment of the present disclosure. As shown, the plurality of modular interior wall unit 500 is arranged with the modular ceiling unit 502. Furthermore, the modular ceiling unit 502 is supported by the ceiling support member 504 of support member arranged at least partially on the top of the wall-studs 506, leaving a gap between the interior ceiling units 502 and the support frame members 508.

Figure 6A:
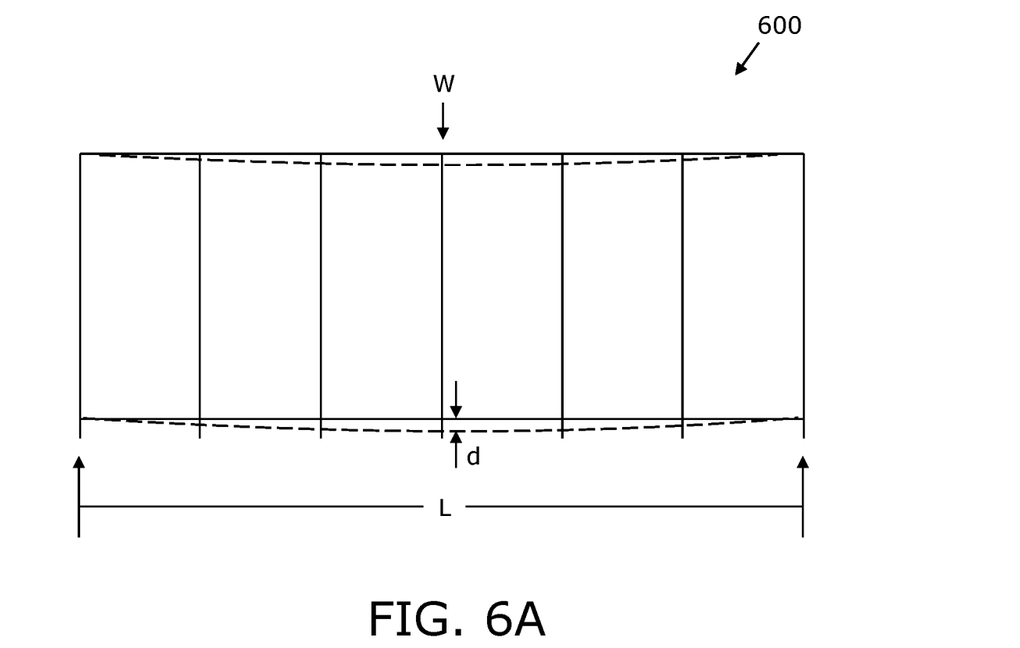
FIGS. 6A and 6B are schematic illustration of deformation of a support frame, in accordance with an embodiment of the present disclosure.
Figure 6B:
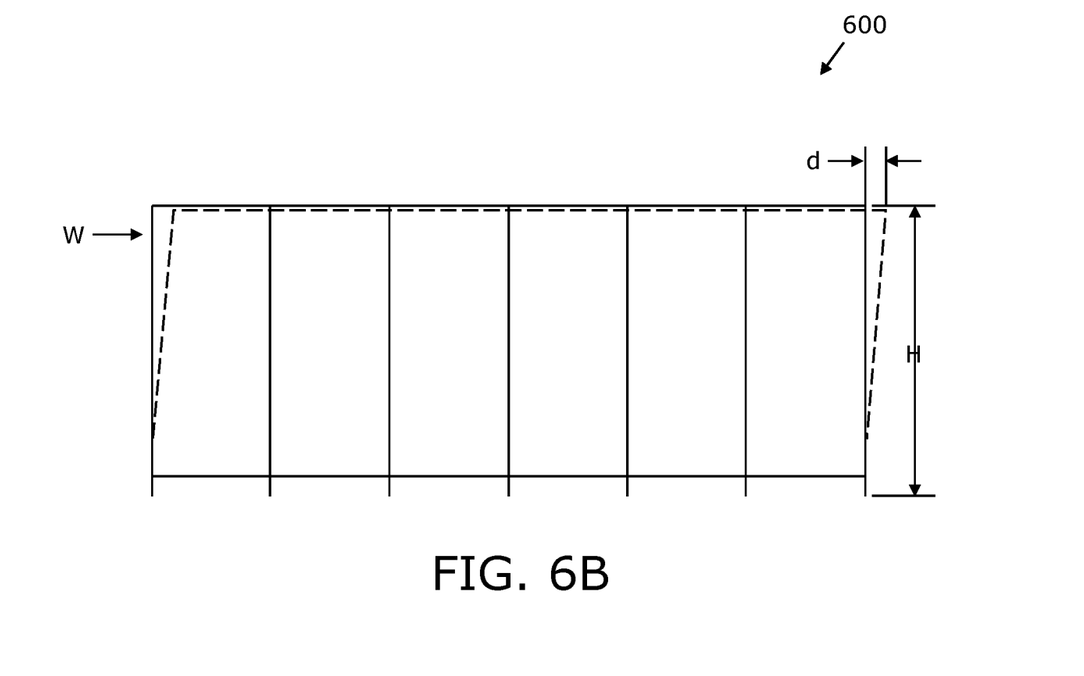

Referring to FIGS. 6A and 6B, there are shown a schematic illustration of deformation of a support frame 600, in accordance with an embodiment of the present disclosure. In FIG. 6A, the support frame 600 is subjected to a self weight W which refers to the weight of the support frame 600 (and practically to all materials attached to the support frame), due to the mass present therein. The self weight W is applied vertically on the support frame 600. As shown, L depicts the length of the support frame 600. Furthermore, the self weight W leads to the deformation or flexure in the support frame 600 referred as deformation d. In the FIG. 6B, the external load W is applied horizontally on the support frame 600. As shown, H depicts the height of the support frame 600. Moreover, due to the external load W, the support frame 600 causes deformation d. The external loads W create shear force in the support frame 600, due to which the support frame is deformed. Typically, the deformation d due to the external load W occurs due to wind, waves, current, rain, soil and hydrostatic pressure, earthquake, accelerations during transport, and the like.

Figure 7:
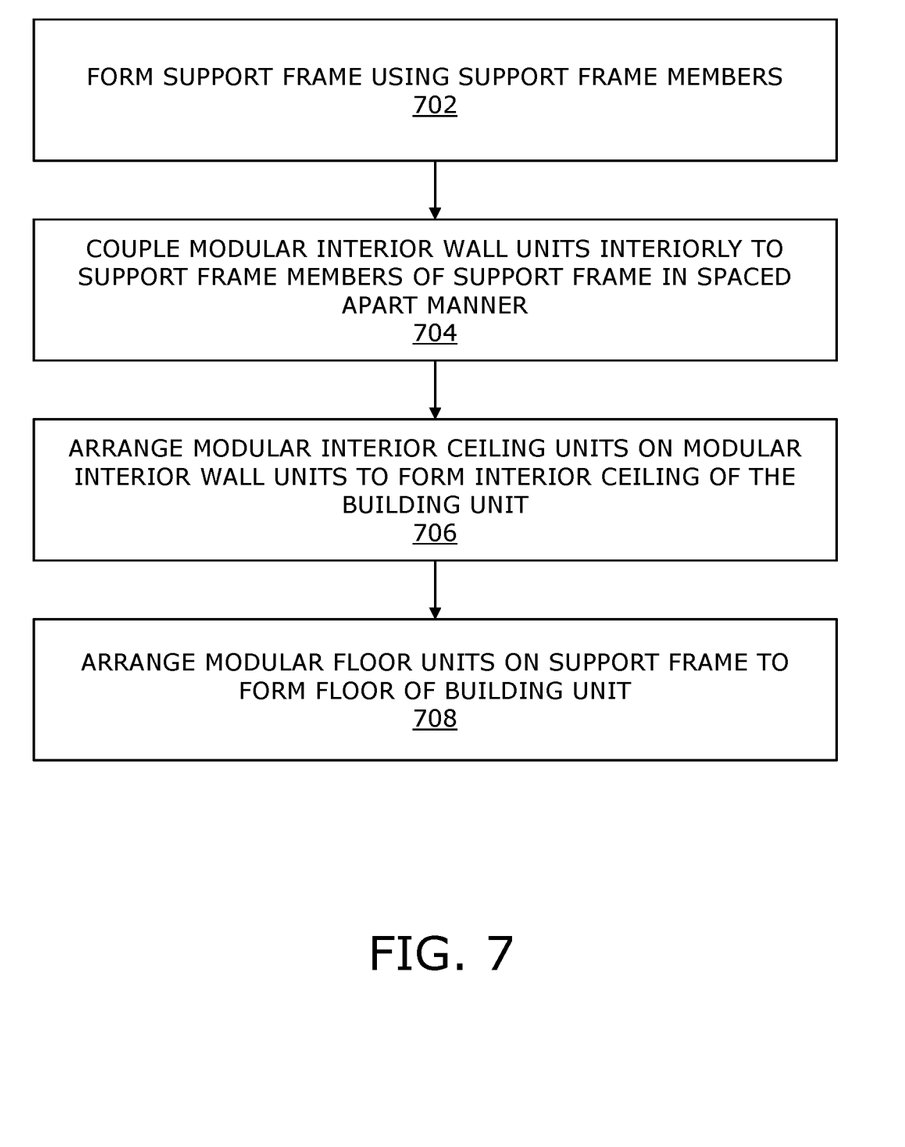
FIG. 7 illustrates steps of a method of constructing a modular building, in accordance with an embodiment of the present disclosure.

Referring to FIG. 7, there is shown steps of a method 700 for manufacturing a building unit, in accordance with an embodiment of the present disclosure. At step 702, a support frame using a plurality of support frame members is formed, and the support frame is configured to be a primary load bearing structure for the building unit. At step 704, a plurality of modular interior wall units is coupled interiorly to the plurality of support frame members of the support frame in a spaced apart manner. At step 706, a plurality of modular interior ceiling units are arranged on the plurality of modular interior wall units to form the interior ceiling of the building unit. At step 708, a plurality of modular floor units is arranged on the support frame to form floor of the building unit. The spaced apart coupling between the support frame and the interior walls and interior ceiling provides flexibility between the support frame and the interior wall and interior ceiling, so that when subjecting the support frame to own mass and/or external loads the deformation of the support frame within a predetermined range is not transmitted to the interior wall and/or interior ceiling.

The steps 702, 704, 706 and 708 are only illustrative and other alternatives can also be provided where one or more steps are added, one or more steps are removed, or one or more steps are provided in a different sequence without departing from the scope of the claims herein.

It may be understood by a person skilled in the art that the FIG. 7 is merely an example, which should not unduly limit the scope of the claims herein. The person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A building unit comprising:
   a support frame having a plurality of support frame members, and the support frame is configured to be a primary load bearing structure for the building unit;
   a plurality of modular interior wall units fixedly coupled interiorly to the plurality of support frame members of the support frame in a spaced apart manner to form interior walls of the building unit,
   a plurality of modular interior ceiling units arranged on the plurality of modular interior wall units to form the interior ceiling of the building unit; and
   a plurality of modular floor units arranged on the support frame to form the floor of the building unit;
   wherein a spaced apart coupling between the support frame and the interior walls and the interior ceiling provides flexibility between the support frame and the interior wall and the interior ceiling, so that the deformation of the support frame within a predetermined range is not transmitted to the interior wall and/or the interior ceiling.

2. A building unit according to claim 1, wherein the spaced apart coupling between the plurality of modular interior wall units and the plurality of support frame members is enabled by at least one spacer or washer coupled using at least one of: fasteners or adhesive pads or glue or combination of the aforementioned.

3. A building unit according to claim 1, wherein the spaced apart coupling between the plurality of modular interior wall units and the plurality of support frame members is in the range of 5 millimetre to 25 millimetre.

4. A building unit according to claim 1, further comprising a plurality of exterior wall-covers coupled exteriorly to the plurality of support frame members of the support frame to form an exterior surface or envelope or a facade of the building unit.

5. A building unit according to claim 4, wherein each of the plurality of modular interior wall units comprises:

a plurality of wall-studs arranged in a spaced apart manner, a plurality of interior wall-covers coupled interiorly to the plurality of wall-studs, a plurality of insulation layers arranged in a space between the plurality of wall-studs, the plurality of interior wall-covers and the plurality of exterior wall-covers.

6. A building unit according to claim 5, wherein each of the plurality of modular interior wall units further comprises an interior ceiling support member arranged at least partially on top of the plurality of wall-studs.

7. A building unit according to claim 6, wherein the plurality of interior ceiling units is supported by the interior ceiling support member, leaving a gap between the plurality of modular interior ceiling units and the plurality of support frame members.

8. A building unit according to claim 5, wherein the plurality of wall-studs includes one or more openings or conduits configured to enable electrical, plumbing connection.

9. A building unit according to claim 1, further comprising a plurality of interior wall joints configured to couple two modular interior wall units.

10. A building unit according to claim 1, wherein the support frame is configured to be the primary load bearing structure based on a number of floors and building construction parameters including at least one of: structural masses, structural loads, live loads, environmental loads or any combination of the aforementioned.

11. A modular building wherein the modular building comprises one or more building units according to claim 1.

12. A method for manufacturing a building unit, the method comprising:

forming a support frame using a plurality of support frame members, and the support frame is configured to be a primary load bearing structure for the building unit;

coupling a plurality of modular interior wall units interiorly to the plurality of support frame members of the support frame in a spaced apart manner;

arranging a plurality of modular interior ceiling units on the plurality of modular interior wall units to form the interior ceiling of the building unit; and arranging a plurality of modular floor units on the support frame to form floor of the building unit;

wherein a spaced apart, fixed coupling between the support frame and the interior walls and the interior ceiling provides flexibility between the support frame and the interior wall and the interior ceiling, so that when subjecting the support frame to own mass and/or external loads the deformation of the support frame within a predetermined range is not transmitted to the interior wall and/or the interior ceiling.

13. A method according to claim 12, wherein the spaced apart coupling between the plurality of modular interior wall units and the plurality of support frame members is enabled by at least one spacer or washer coupled using at least one of: fasteners or adhesive pads.

14. A method according to claim 12, further comprising coupling a plurality of exterior covers exteriorly to the plurality of support frame members of the support frame to form an exterior surface or envelope or a facade of the building unit.

15. A method according to claim 12, wherein each of the plurality of modular wall units comprises:

arranging a plurality of wall-studs in a spaced apart manner, coupling a plurality of interior wall-covers interiorly to the plurality of wall-studs, coupling a plurality of exterior wall-covers exteriorly to the plurality of wall-studs, and arranging a plurality of insulation layers in a space between the plurality of wall-studs, the plurality of interior wall-covers and the plurality of exterior wall-covers.

* * * * *